United States Patent [19]

McGraw et al.

[11] Patent Number: 4,851,144

[45] Date of Patent: Jul. 25, 1989

[54] LUBRICANTS FOR REFRIGERATION COMPRESSORS

[75] Inventors: Philip W. McGraw, Lake Jackson; Eldon L. Ward, Angleton, both of Tex.

[73] Assignee: The Dow Chemical Company, Midland, Mich.

[21] Appl. No.: 295,612

[22] Filed: Jan. 10, 1989

[51] Int. Cl.$^4$ ................. C10M 105/34; C10M 105/36

[52] U.S. Cl. ................................... 252/52 A; 252/565; 252/67; 252/68

[58] Field of Search ................ 252/52 A, 67, 68, 56 S

[56] References Cited

U.S. PATENT DOCUMENTS

| | | | |
|---|---|---|---|
| 4,248,726 | 2/1981 | Uchinums et al. | 252/68 |
| 4,267,064 | 5/1981 | Sasaki et al. | |
| 4,302,343 | 11/1981 | Carswell et al. | |
| 4,362,635 | 12/1982 | Dhein et al. | 252/56 S |
| 4,428,854 | 1/1984 | Enjo et al. | |
| 4,431,557 | 2/1984 | Shimizu et al. | |
| 4,454,052 | 6/1984 | Shoji et al. | |
| 4,501,616 | 2/1985 | Fink et al. | 252/52 A |
| 4,751,012 | 6/1988 | Ward | 252/52 A |
| 4,755,316 | 7/1988 | Magid et al. | 252/68 |

OTHER PUBLICATIONS

Research Disclosure 17463; Research Disclosure Oct. 1978.

H. H. Druse et al. "Fundamentals of Lubrication in Refrigerating Systems and Heat Pumps" pp. 763–783, ASHRAE Transactions vol. 90, Part 2B, 1984.

K. S. Sanvordenker et al. "A Review of Synthetic Oils for Refrigeration Use" ASHRAE Symposium, Nassau, Jun. 29, 1972.

*Primary Examiner*—Jacqueline V. Howard
*Attorney, Agent, or Firm*—Benjamin G. Colley

[57] ABSTRACT

Lubricant base compositions for compression refrigeration are composed of 95 to 5% by weight of polyether polyols having a number average molecular weight from about 400 to about 5000 and 5 to 95% of esters made from polyhydric alcohols with alkanoic acids or esters made from alkanedioic acids with alkanols. A refrigeration fluid is made from the base composition with the addition of selected hydrochlorofluorocarbons and hydrofluorocarbons so that the base composition is miscible with the refrigerant in the range from −20° C. to greater than 65° C.

15 Claims, No Drawings

LUBRICANTS FOR REFRIGERATION COMPRESSORS

FIELD OF THE INVENTION

This invention relates to a blend of glycols and esters useful for lubricating heat pumps and air conditioning compressors.

Refrigerant R12 (dichlorodifluoromethane), is used in automotive air conditioners and many other types of refrigeration and air conditioning compressors. It is a chlorofluorocarbon that has been identified as depleting atmospheric ozone. The Montreal Accords restrict the production of R12 by 1990. Refrigerant R134a (1,1,1,2-tetrafluoroethane) has a vapor pressure that is very similar to R12 and it has the advantage that it does not deplete atmospheric ozone. R134a can replace R12 in most refrigeration systems without major redesign of present equipment. It could be used in automotive air conditioners without any re-tooling by the automotive companies.

The major problem of using R134a is that conventional lubricants such as naphthenic mineral oils
soluble over the temperature range $-20°$ to $80°$ C., are not the operating temperatures encountered in the different refrigeration applications. Some polyglycols are soluble in R134a at $25°$ C. and below but phase separate below $60°$ C. Phase separation of the lubricant from the refrigerant can cause poor lubrication of the compressor which results in increased wear and decreased compressor life. It is well known in the refrigeration industry that lubricant concentration in the refrigerant is limited to the range of about 10 to 20% due to thermodynamic considerations. The usefulness of this invention is that it will enable compressor manufacturers to substitute R134a and other hydrofluorocarbons or hydrochlorofluorocarbons for chlorofluorocarbons such as R12 in most compressors without mechanical modification to existing compressors and be able to operate over a broad temperature range.

DESCRIPTION OF THE PRIOR ART

The fundamentals of lubrication in air conditioners are set forth by H. H. Kruse et al. in "Fundamentals of Lubrication in Refrigeration Systems and Heat Pumps" pages 763–783: ASHRAE Transactions Vol 90 part 2B (1984). This reference is incorporated by reference herein.

Lubricants for various air compressors are known from U.S. Pat. Nos. 4,302,343 and 4,751,012. These patents show that various blends of esters and polyether polyols make a long lasting lubricant. However, these blends either have a neat viscosity less than 75 centistokes at $38°$ C. or are immiscible at the high temperatures used in refrigeration.

U.S. Pat. No. 4,755,316 discloses compositions containing one or more polyether polyols for lubricating refrigeration compressors using R134a. However, those compositions of the '316 patent which display adequate viscosity at the high temperatures in the compressor are not miscible at the same high temperature. Conversely, those compositions of the '316 patent which exhibit miscibility at the low temperatures are of too low a viscosity for adequate lubrication. This reference is incorporated by reference herein.

SUMMARY OF THE INVENTION

The invention comprises lubricant compositions that are miscible in hydrofluorocarbon and hydrochlorofluorocarbon refrigerants in the range from $-20°$ C. to greater than $65°$ C. and at the same time have a neat viscosity greater than 75 centistokes at $38°$ C.($100°$ F.). In general, the compositions consist of (A) about 5 to 95% of a polyether polyol which has the formula

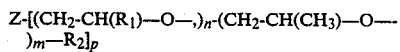

where
Z is the residue of a compound having 1–8 active hydrogens,
$R_1$ is hydrogen, ethyl, or mixtures thereof.
n is 0 or a positive number,
m is a positive number,
n+m is a number having a value which will give a polyether polyol with a number average molecular weight range from about 400 to about 5000,
$R_2$ is hydrogen or an alkyl group of 1 to 6 carbon atoms,
p is an integer having a value equal to the number of active hydrogens of Z, and (B) about 95 to 5% of an ester selected from the group consisting of
(1) esters made from polyhydric alcohols with alkanoic acids, and
(2) esters made from alkanedioic acids with alkanols.

DETAILED DESCRIPTION OF THE INVENTION

The neutral esters used in this invention are well known and/or available. Examples of suitable esters are the esters of dihydric alcohols, trihydric alcohols, and tetrahydric alcohols having 4 to 18 carbons such as glycerine, ethylene glycol, propylene glycol pentaerythritol, dipentarrythritol, tripentaerythritol, trimethylolpropane, trimethylolbutane, and trimethylolethane with alkanoic acids of 4 to 18 carbon atoms. These are illustrated by ethylene glycol distearate, propylene glycol dipelargonate, glycerine trioleate, trimethylolpropane triheptonate, and pentaerythritol tetraheptonate.

Also useful are the esters of monohydric alcohols having 4 to 8 carbons with alkanedioic acids having 4 to 18 carbons such as succinic, adipic, suberic, tetradecane 1,14-dioic acid, and hexadecane-1,16-dioic acid, Examples of the polyether polyols or polyoxyalkylene polyols used in this invention are those derived from ethylene oxide, propylene oxide, 1-2, or 2-3 butylene oxide. The above oxides may be polymerized alone, i.e., homopolymerized or in combination. The combined oxides may also be combined in a random or block addition while some of the above compounds may be of a hydrophilic nature, those of a hydrophobic nature are preferred, such as those derived from propylene oxide, butylene oxides or combinations thereof.

Examples of suitable capped polyoxyalkylene glycols are those derived from ethylene, propylene, and butylene oxides wherein the alkylene oxides are initiated from a compound having 1 to 8 active hydrogens in a known manner. The terminal hydroxyl groups may be further reacted with alkyl halides to form alkyl capped polyoxyalkylene glycols. These polyether polyols and their preparation are well known from the book "Polyurethanes" by Saunders and Frisch, Interscience Publishers (1962), pages 33-39. This book is incorporated by reference herein.

Examples of suitable initiator compounds which are employed to prepare the above polyether polyols are compounds having 1-8 active hydrogens such as for example water, methanol, ethanol, propanol, butanol, ethylene glycol, propylene glycol, butylene glycol, 1,6-hexane diol, glycerine, trimethylolpropane, pentaerythritol, polyamines, sorbitol, sucrose, mixtures thereof and the like.

Other initator compounds which are useful include monohydric phenols and dihydric phenols and their alkylated derivatives such as phenol, o, m, and p cresol, guaiacol, saligenin, carvacrol, thymol, o and p -hydroxy diphenyl, catechol, resorcinol, hydroquinone, pyrogallol and phloroglucinol.

Other initator compounds which are useful include ammonia, ethylene diamine, aminoethylethanolamine, N-aminoethylpiperazine, diethylenetriamine and triethylene tetramine.

The foregoing polyether polyols should have a number average molecular weight range from about 400 to 5000 and preferably in the range 500 to 1500.

The foregoing polyether polyols are blended to give a base lubricant composition containing 5 to 95 weight percent of the esters and 95 to 5 weight percent of the polyols with the ranges 70 to 90 polyols and 30 to 10 esters being the preferred ranges, respectively.

The preferred polyether polyols are based on an initiator selected from glycerine or ethylene diamine and the preferred ester is a pentaerythritol tetraester of a mixture of alkanoic acids having 7-9 carbons.

The final lubricant compositions of this invention may contain effective amounts of ashless additives, such as antioxidants, corrosion inhibitors, metal deactivators, lubricity additives, viscosity index improvers and extreme pressure additives as may be required.

Examples of useful ashless antioxidants which could be used herein are phenyl naphthylamines, i.e., both alpha and beta-naphthyl amines: diphenyl amine: iminodibenzyl: p,p-dibutyl-diphenylamine: p,p'dioctyldiphenylamine: and mixtures thereof. Other suitable antioxidants are hindered phenolics such as 6-t-butylphenol, 2,6-di-t-butylphenol and 4-methyl-2,6-di-t-butylphenol and the like.

Examples of suitable ashless metal corrosion inhibitors are commercially available, such as -oleoylsarcosine and Irgalube 349 from Ciba-Geigy. This inhibitor compound is an aliphatic amine salt of phosphoric acid monohexyl ester. Other useful metal corrosion inhibitors are NA-SUL DTA and NA-SUL EDS from the White Chemical Company (diethylenetriamine dinonylnapthalene sulfonate and ethylene diamine dinonylnaphthalene sulfonate), respectively.

Examples of suitable ashless cuprous metal deactivators are imidazole, benzimidazole, pyrazole, benzotriazole, tolutriazole, 2-methyl benzimidazole, 3,5-dimethyl pyrazole, and methylene bis-benzotriazole.

An effective amount of the foregoing additives for use in a refrigerant compression is generally in the range from 0.1 to 5.0% by weight for the antioxidants, 0.1 to 5.0% by weight for the corrosion inhibitors, and 0.001 to 0.5 percent by weight for the metal deactivators. The foregoing weight percentages are based on the total weight of the polyether polyols and the esters. It is to be understood that more or less of the additives may be used depending upon the circumstance for which the final composition is to be used.

Examples of refrigerants useful in this invention are hydrochlorofluorocarbons such as chlorodifluoromethane, chlorofluoromethane, 2,2-dichloro-1,1,1-trifluoroethane, 1-chloro-1,2,2,2-tetrafluoroethane, 2-chloro-1,1,2,2-tetrafluoroethane, 1-chloro-2,2,2-trifluoroethane, 1,1-dichloro-1-fluoroethane and 2-chloro-2,2-difluoroethane.

Examples of hydrofluorocarbon refrigerants useful in this invention are 1,1,1,2-tetrafluoroethane, 1,1,2,2-tetrafluoroethane, 1,1,1-trifluoroethane, 2,2-difluoroethane, trifluoromethane, methylene fluoride, methyl fluoride, difluoroethylene and pentafluoroethane.

Several examples of the present invention with the refrigerant R134a (1,1,1,2-tetrafluoroethane) are given in Table II. Several control runs with the refrigerant R134a (1,1,1,2-tetrafluoroethane) are given in Table I. Table III illustrates the invention with other refrigerants such as R141b, R22, and R123

The general procedure for the preparation of the controls and the examples is as follows. The selected polyol and ester are mixed and vacuum stripped. Glass ampoules are washed with acetone and vacuum dried at 110° C. The empty ampoule or tube is weighed and the mixture to be evaluated is syringed into the tube. The tube is re-weighed to determine the weight of lubricant. The tube is evacuated to remove air and then immersed in a dry ice/methylene chloride slurry in a Dewar flask. The R134a is transferred at a pressure of 8 psig into the tube to give the desired lubricant concentration. The filled ampoule was then disconnected and allowed to equilibrate at room temperature, 25° C. The ampoules were placed in a controlled temperature bath and the temperature varied from −20° to 85° C. while observing for phase separation. The temperature of phase separation is called the upper solution critical temperature (USCT) and is reported in degrees C. Temperatures above 85° C. were not investigated because of pressure limitations of the glass ampoule apparatus. Systems with USCT's above this temperature measurement limit are denoted as greater than 85° C.

TABLE 1

| | R134a Upper Solution Critical Temperature Data | | |
|---|---|---|---|
| Run Number | Lubricant/Neat Viscosity (cs @ 100° F. or 38° C.) | Lubricant Wt % in R134a | USCT °C. |
| Control A | 100 Mobil P51 (Pentaerythritol tetraester of a mixture of alkanoic acids having 7-9 carbons) 25 | 25 | 80 |
| Control B | 100 Mobil P41 (Trimethylolpropane triheptonate) 15 | 16 | >83 |
| Control C | 100 Emery 2914-D (Dimethyl azelate) 3 | 15 | >85 |
| Control D | 100 L-1150 (n-butanol + PO to 1150 Mol Wt) 57 | 16 | 60 |
| Control E | 100 P-1000 (Propylene glycol + PO to 1000 Mol Wt) 73 | 25 | 70 |
| Control F | 100 P-2000 (Propylene glycol + PO to 2000 Mol Wt) 160 | 12 | <25 |
| Control G | 70/30 P2000/P425 (n-butanol | 15 | 45 |

TABLE 1-continued

| | R134a Upper Solution Critical Temperature Data | | |
|---|---|---|---|
| Run Number | Lubricant/Neat Viscosity (cs @ 100° F. or 38° C.) | Lubricant Wt % in R134a | USCT °C. |
| | + PO to 425 Mol Wt) 95 | | |
| Control H | 70/30 L-1150/Emery 2914D 20 | 11 | >70 |
| Control I | 70/30 P-2000/Mobil P51 87 | 13 | <35 |
| Control J | 30/70 P-2000/Mobil P41 40 | 20 | 80 |

Table I shows that the esters and the polyols by themselves do not have both the required viscosity or USCT. Controls H, I and J show that even certain polyester blends do not have the required viscosity to be effective.

TABLE II

| | R134a Upper Solution Critical Temperature Data | | |
|---|---|---|---|
| Run Number | Lubricant/Neat Viscosity (cs @ 100° F. or 38° C.) | Lubricant Wt % in R134a | USCT °C. |
| Example 1 | 90/10 CP700 (glycerine + PO to 700 mol wt) Mobil P51 89 | 9 | >85 |
| Example 2 | 90/10 CP700/Mobil P51 89 | 12 | >85 |
| Example 3 | 90/10 CP700/Mobil P51 89 | 17 | 80 |
| Example 4 | 90/10 CP700/Mobil P51 89 | 22 | 80 |
| Example 5 | 75/25 EDA511 (ethylene diamine + PO to 511 mol wt)/Mobil P41 203 | 8 | >80 |
| Example 6 | 75/25 EDA511 Mobil P41 203 | 19 | >83 |
| Example 7 | 75/25 EDA511 Mobil P41 203 | 29 | >85 |
| Example 8 | 75/25 EDA511 Mobil P51 245 | 9 | >85 |
| Example 9 | 75/25 EDA511 Mobil P51 245 | 11 | >85 |
| Example 10 | 75/25 EDA511 Mobil P51 245 | 20 | >85 |
| Example 11 | 70/30 CP1406 (glycerine + PO to 1406 mol wt) Mobil P51 78 | 18 | 65 |

TABLE III

| | Upper Solution Critical Temperature Data | | |
|---|---|---|---|
| Run Number | Lubricant/Neat Viscosity (cs @ 100° F. or 38° C.) | Lubricant Wt % in Refrigerant | USCT °C. |
| Example 12 with R141b | 75/25 EDA511/Mobil P51 245 | 22 | >65 |
| Example 13 with R22 | 75/25 EDA511/Mobil P51 245 | 18 | >65 |
| Example 14 with R123 | 75/25 EDA511/Mobil P51 245 | 18 | >65 |

We claim:

1. A lubricant composition miscible in hydrofluorocarbon and hydrochlorofluorocarbon refrigerants in the range from −20° to greater than 65° C. and having a viscosity greater than 75 centistokes at 38° C. comprising:
   (A) about 95 to 5% of a polyether polyol which has the formula $$Z-[(CH_2-CH(R_1)-O-)_n-(CH_2-CH(CH_3)-O-)_m-R_2]_p$$

where
   Z is the residue of a compound having 1-8 active hydrogens,
   $R_1$ is hydrogen, ethyl, or mixtures thereof,
   n is 0 or a positive number,
   m is a positive number,
   n+m is a number having a value which will give a polyether polyol with a number average molecular weight range from about 400 to about 5000,
   $R_2$ is hydrogen or an alkyl group of 1 to 6 carbon atoms,
   p is an integer having a value equal to the number of active hydrogens of Z, and
   (B) about 5 to 95% of an ester selected from the group consisting of
   (1) esters made from polyhydric alcohols with alkanoic acids, and
   (2) esters made from alkanedioic acids with alkanols.

2. A lubricant composition miscible in hydrofluorocarbon and hydrochlorofluorocarbon refrigerants in the range from −20° to greater than 65° C. and having a viscosity greater than 75 centistokes at 38° C. comprising:
   (A) about 95 to 5% of a polyether polyol which has the formula $$Z-[(-CH_2-CH(CH_3)-O-)_n-R]_p$$

where
   Z is the residue of a compound having 1-8 active hydrogens,
   n is a number having an average value which will give a polyether polyol with a number average molecular weight range from about 400 to about 5000,
   R is hydrogen or an alkyl group of 1 to 6 carbon atoms,
   p is an integer having a value equal to the number of active hydrogens of Z, and
   (B) about 5 to 95% of an ester selected from the group consisting of
   (1) esters made from polyhydric alcohols with alkanoic acids, and
   (2) esters made from alkanedioic acids with alkanols.

3. A lubricant composition as set forth in claim 2 wherein the polyether polyol is based on a residue selected from the group consisting of glycerine and ethylene diamine and the ester is a pentaerythritol tetraester of a mixture of alkanoic acids having 7-9 carbons.

4. A fluid composition for use in compression refrigeration comprising
   (A) a refrigerant selected from the group consisting of hydrochlorofluorocarbons and hydrofluorocarbons, and
   (B) a lubricant composition which comprises
   (1) about 95 to 5% of a polyether polyol which has the formula $$Z-[(CH_2-CH(R_1)-O-)_n-(CH_2-CH(CH_3)-O-)_m-R_2]_p$$

where
   Z is the residue of a compound having 1-8 active hydrogens, $R_1$ is hydrogen, ethyl, or mixtures thereof.

n is 0 or a positive number, m is a positive number, n+m is a number having a value which will give a polyether polyol with a number average molecular weight range from about 400 to about 5000, $R_2$ is hydrogen or an alkyl group of 1 to 6 carbon atoms, p is an integer having a value equal to the number of active hydrogens of Z, and (2) about 5 to 95% of an ester selected from the group consisting of (a) esters made from polyhydric alcohols with alkanoic acids, and (b) esters made from alkanedioic acids with alkanols.

5. The composition of claim 4 wherein said fluid composition contains a concentration of about 1 to about 30% by weight of lubricant composition.

6. The composition of claim 4 wherein said hydrochlorofluorocarbons are selected from the group consisting of chlorodifluoromethane, chlorofluoromethane, 2,2-dichloro-1,1,1-trifluoroethane, 1-chloro-1,2,2,2-tetrafluoroethane, 2-chloro-1,1,2,2-tetrafluoroethane, 1-chloro-2,2,2-trifluoroethane, 1,1-dichloro-1-fluoroethane and 2-chloro-2,2-difluoroethane.

7. The composition of claim 4 wherein said hydrofluorocarbons are selected from the group consisting of 1,1,1,2-tetrafluoroethane, 1,1,2,2-tetrafluoroethane, 1,1,1-trifluoroethane, 2,2-difluoroethane, trifluoromethane, methylene fluoride, methyl fluoride, difluoroethylene and pentafluoroethane.

8. The composition of claim 4 wherein said hydrofluorocarbon is 1,1,1,2-tetrafluoroethane.

9. A fluid composition for use in compression refrigeration comprising (A) a refrigerant selected from the group consisting of hydrochlorofluorocarbons and hydrofluorocarbons, and (B) a lubricant composition which comprises (1) about 95 to 5% of a polyether polyol which has the formula

$$Z-[(-CH_2-CH(CH_3)-O-)_n-R]_p$$

where

Z is the residue of a compound having 1-8 active hydrogens, n is a number having an average value which will give a polyether polyol with a number average molecular weight range from about 400 to about 5000, R is hydrogen or an alkyl group of 1 to 6 carbon atoms, p is an integer having a value equal to the number of active hydrogens of Z, and (2) about 5 to 95% of an ester selected from the group consisting of (a) esters made from polyhydric alcohols with alkanoic acids, and (b) esters made from alkanedioic acids with alkanols.

10. A lubricant composition as set forth in claim 9 wherein the polyether polyol is based on a residue selected from the group consisting of glycerine and ethylene diamine and the ester is a pentaerythritol tetraester of a mixture of alkanoic acids having 7-9 carbons.

11. The composition of claim 9 wherein said fluid composition contains a concentration of about 1 to about 25% by weight of lubricant composition.

12. The composition of claim 9 wherein said hydrochlorofluorocarbons are selected from the group consisting of chlorodifluoromethane, chlorofluoromethane, 2,2-dichloro-1,1,1-trifluoroethane, 1-chloro-1,2,2,2-tetrafluoroethane, 2-chloro-1,1,2,2-tetrafluoroethane, 1-chloro-2,2,2-trifluoroethane, 1,1-dichloro-1-fluoroethane and 2-chloro-2,2-difluoroethane.

13. The composition of claim 9 wherein said hydrofluorocarbons are selected from the group consisting of 1,1,1,2-tetrafluoroethane, 1,1,2,2-tetrafluoroethane, 1,1,1-trifluoroethane, 2,2-difluoroethane, trifluoromethane, methylene fluoride, methyl fluoride, difluoroethylene and pentafluoroethane.

14. The composition of claim 9 wherein said hydrofluorocarbon is 1,1,1,2-tetrafluoroethane.

15. A method of lubricating and/or operating compression refrigeration equipment which comprises using as the lubricant the composition of claims 3, 4, 5, 6, 7, 8, 9, 10, 11, 12, 13 or 14.

* * * * *